United States Patent
Boyd

[11] 3,751,192
[45] Aug. 7, 1973

[54] SUBMERSIBLE PUMP DRIVE SYSTEM
[75] Inventor: Clinton A. Boyd, Tulsa, Okla.
[73] Assignee: Borg-Warner Corporation, Chicago, Ill.
[22] Filed: Apr. 12, 1971
[21] Appl. No.: 132,942

[52] U.S. Cl............................. 417/411, 318/432
[51] Int. Cl...................... F04b 35/04, H02p 7/00
[58] Field of Search....................... 417/411, 15, 42, 417/45; 318/148, 230, 432

[56] References Cited
UNITED STATES PATENTS
3,226,619  12/1965  Block............................. 318/148 X
FOREIGN PATENTS OR APPLICATIONS
265,988  4/1927  Great Britain........................ 417/411

*Primary Examiner*—William L. Freeh
*Assistant Examiner*—John T. Winburn
*Attorney*—Donald W. Banner, William S. McCurry and James J. Jennings, Jr.

[57] ABSTRACT

A pump is coupled with a motor in a deep well to remove fluid of variable density. The downhole motor is energized from an electrical generator which produces substantially constant volts/hertz output energy. The generator has an input shaft to which a constant torque is applied from a variable drive unit. As the fluid becomes lighter, the downhole motor speeds up and the generator produces an increase in both frequency and voltage amplitude to maintain system efficiency.

7 Claims, 2 Drawing Figures

Inventor
Clinton A. Boyd
By James J. Jennings, Jr.
Attorney

SUBMERSIBLE PUMP DRIVE SYSTEM

BACKGROUND OF THE INVENTION

There have long been problems in removing a fluid such as crude oil from a deep well. A motor and pump assembly is generally positioned at the downhole location, and energized from electrical equipment at the surface. With this arrangement the downhole motor drives the pump, raising the fluid through a conduit to the surface. For efficiency the motor-pump assembly at the downhole location is sized or rated for the fluid density at a particular location. After the equipment has been operating, the denser fluid is pumped off and thereafter lighter fluid is raised through the conduit. This lighter fluid presents a reduced load to the downhole equipment and the efficiency of the system is reduced. Various attempts have been made to maintain system efficiency. For example the downhole fluid density could be sensed, the motor speed sensed, or some other parameter sensed to provide an indication of the varying load. This signal may be fed back to the surface to regulate equipment, such as an electrical inverter, for varying the energization level provided to the downhole motor as a function of changing load. Of course there is additional expense in providing the feedback signal and the regulating arrangement at the surface. In addition, the added electrical conductors necessary to return the feedback signal can be damaged, and disable the regulating arrangement.

It is therefore a primary consideration of this invention to provide a submersible pump drive arrangement in which the efficiency of the downhole unit is maintained although the fluid density varies.

A related consideration of this invention is the provision of such a system, without any feedback arrangement or the necessity for sensing the changing load conditions at the downhole location.

SUMMARY OF THE INVENTION

The present invention is useful for removing a fluid of variable density from a deep well position through a conduit to a surface location. The system includes a pump which is positioned in the well, and coupled to the conduit to remove the fluid as the pump is driven. An electrical motor is also positioned in the well, and coupled to the pump to drive the pump when the motor is energized. At the surface location is an electrical generator having an input shaft, and having output connections coupled over an electrical cable to the downhole motor, to energize the motor as the generator is driven over its input shaft.

In accordance with the present invention, a variable drive unit is coupled to the generator input shaft. This variable drive unit is of the type which displaces the generator input shaft at a constant torque level. A motor, internal combustion engine, or other unit can be used to supply energy to the variable drive unit which provides the constant torque. As the fluid density decreases, the downhole motor speeds up, and the electrical generator also increases its speed. This speed increase of the generator in turn increases the frequency and the amplitude of the voltage supplied to the motor, maintaining a high efficiency for the complete system.

THE DRAWING

In the drawing:

FIG. 1 is a block diagram depicting a system connected in accordance with the inventive teaching: and FIG. 2 is a partial block diagram illustrating an alternate system for supplying energy to the variable speed drive of the system.

DETAILED DESCRIPTION OF THE INVENTION

Figure 1:
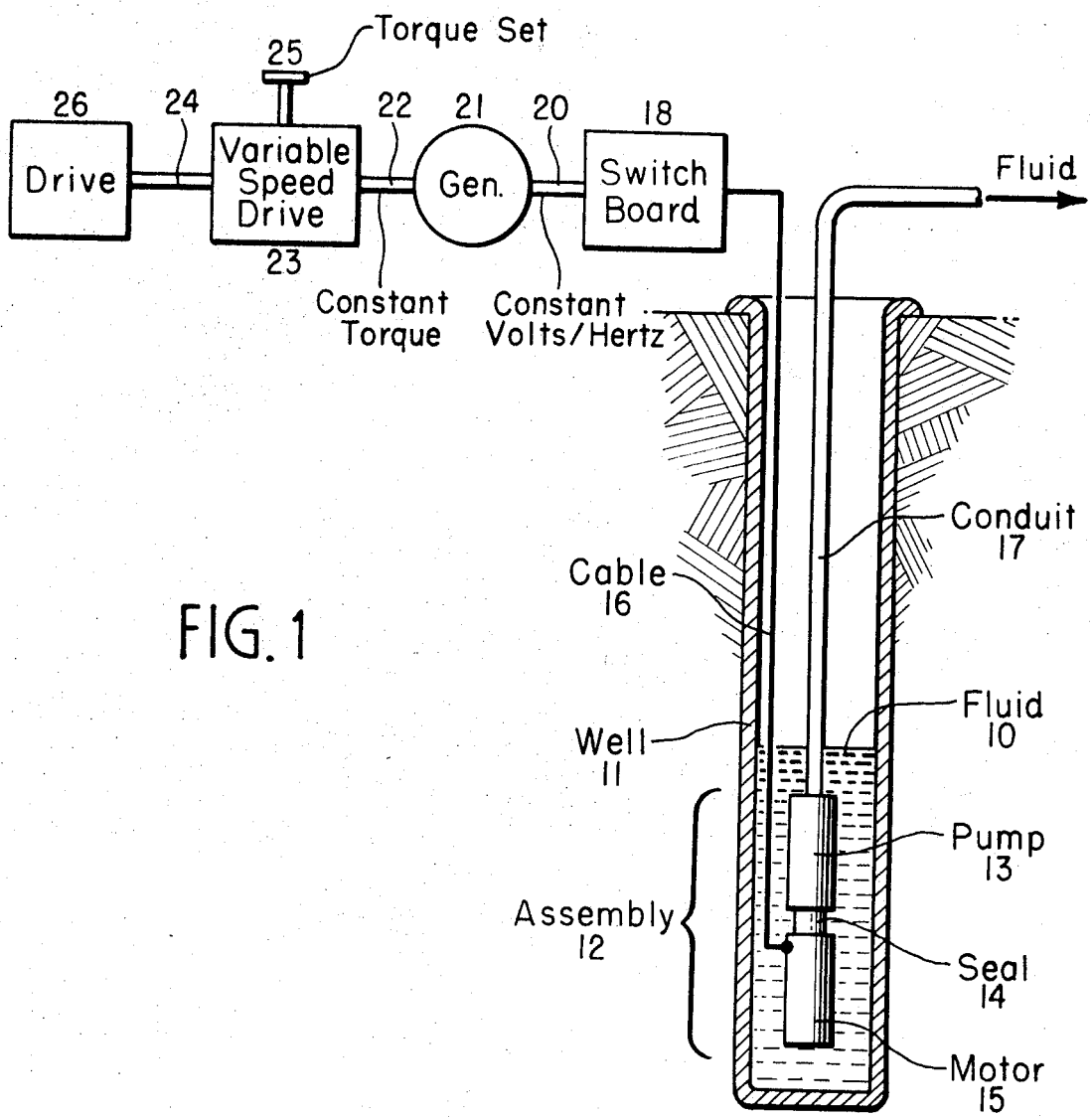
Figure 2:
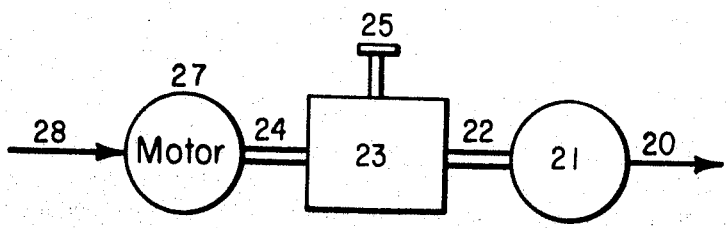

FIG. 1 depicts an arrangement of the present invention for removing fluid 10 of variable density from a deep well 11. Assembly 12 positioned within the bottom of the well includes a pump 13 coupled through a seal 14 to an electrical motor 15. When energy is supplied over cable 16, motor 15 drives the pump 13 and lifts the fluid upwardly through a conduit 17 for discharge at the surface.

At the surface location a switchboard 18 is shown for receiving input electrical energy over cable 20 and passing output energy over cable 16 to the downhole motor. The electrical switchboard may include a transformer, protective relays, or other equipment conventionally incorporated in such a system. For purposes of explaining and understanding the present invention, the switchboard and attendant components are not necessary.

An electrical generator 21 has an input shaft 22, and electrical output contacts (not visible) coupled to the conductor 20 for transferring energy over cable 16 to the downhole motor. In accordance with an important aspect of this invention, a constant torque is applied to the input shaft of generator 21. Another significant aspect of the invention is that generator 21 is wound to provide a substantially constant ratio of the amplitude to the frequency of its output voltage. In the art this has generally been termed "Constant volts-per-cycle" operation. With the advent of the hertz unit, it is now frequently termed "Constant voltz/hertz" operation. For example the generator 21 might be wound and mechanically constructed to operate satisfactorily at 90 cycles per second (or 90 hertz), even though its base speed would be at 60 hertz. The physical arrangement would be such that as the generator speeds up, its frequency gradually increases to 90 hertz with a concomitant increase in the voltage amplitude by 50 percent. In this way the magnetization of the downhole motor 15 is maintained substantially constant, applying a constant torque to pump 13.

The constant torque is applied to the shaft 22 by variable speed drive arrangement 23. This can be a variable clutch, or variable speed coupling, or any other arrangement which receives a mechanical input drive over its shaft 24 and provides a virtually constant torque to the generator shaft 22. To accommodate different systems, a torque set knob 25 can be provided. This torque set 25, by way of example, can be the control handle of an INFI-DRIVE (Reg. Trademark) adjustable speed drive available from the Borg-Warner Industrial Drives division in Tulsa, Oklahoma. Of course any other suitable drive may be substituted, so long as the constant torque can be provided to the input shaft 22 of generator 21. In general such a drive accommodates the driving speed to load variations so that the requisite constant torque is maintained.

Drive unit 26 shown generally in FIG. 1 can be an internal combustion engine, diesel engine or any suitable arrangement for providing the requisite displacement of shaft 24 to the variable speed drive unit 23. Of course drive unit 26 can be replaced by a second electrical motor 27, receiving a-c energy over an input cable or line 28 to supply power to the system. The precise equipment utilized to provide the input angular displacement on shaft 24, and the constant torque on input shaft 22 of the generator, are not restrictions on the present invention. It is the provision of this constant torque, together with a generator which provides a virtually constant output voltz/hertz ratio, that contributes to the enhanced efficiency achieved with this arrangement.

In operation, the system is initially set to operate for the heavier load condition of the downhole fluid. For example, generator 21 may be producing output voltage at approximately 60 hertz and a given voltage amplitude under these conditions. As the fluid becomes lighter, pump 13 encounters a reduced load and motor 15 tends to speed up. With maintenance of the constant torque on input shaft 22 of generator 21, the speed and thus the frequency of generator 21 gradually increases, with a simultaneous increase in the amplitude of its output voltage. This maintains a constant energizing current for the motor 15, and provides a virtually constant torque to pump 13. This in effect matches the entire system to the variable density of the fluid at the downhole location.

SUMMARY

The present invention achieves a high efficiency without any requirement of a feedback signal to modulate the energy supplied over cable 16 to the downhole motor 15. By providing a virtually constant torque to the generator, which generator in turn provides a constant volts/hertz ratio in its output voltage, the system (in effect) changes the size or rating of the downhole pump without the necessity of hauling the entire assembly 12 to the surface and making a physical change in the pump. For such a pump its capacity varies as a function of speed, and the head varies as the square of the speed. By maintaining a constant torque to the downhole pump while allowing it to speed up when the fluid becomes less dense, the desired economy and efficiency is maintained without the necessity of a feedback system. In one such installation, the incorporation of the arrangement depicted in FIG. 1 increased the production of the well from 220 to 500 barrels per day. This is a striking manifestation of the increased efficiency available with the system depicted in FIG. 1.

While only particular embodiments of the invention has been described and illustrated, it is manifest that various modifications and alterations may be made therein. It is therefore the intention in the appended claims to cover all such modifications and alterations as may fall within the true spirit and scope of the invention.

What is claimed is:

1. An energizing system in which an electrical motor is coupled to a pump for pumping fluid of varying density, comprising:

an electrical generator connected to supply energy over a cable to the motor, such that the voltage amplitude is always maintained with a substantially constant ratio to the frequency of the energy supplied; and means coupled to the input shaft of the generator, for supplying input mechanical energy at a substantially constant torque level to the generator, allowing the generator to produce an increased output voltage at an increased frequency as the pump speeds up when the fluid becomes less dense.

2. An energizing system as claimed in claim 1, in which the pump and the electrical motor are disposed in a well, and a conduit provided to remove the fluid from the well as the pump is driven.

3. An energizing system as claimed in claim 1, in which the means for providing a constant torque on the generator input shaft includes a variable speed drive arrangement connected to the input shaft, and a drive means is connected to supply energy to the variable speed drive arrangement.

4. An energizing system as claimed in claim 3, in which the variable speed drive arrangement includes an adjustment setting for establishing the level of torque to be supplied over the input shaft to the generator.

5. A system for moving a fluid of variable density from a deep well position through a conduit to a surface location, including:

a pump positioned in the well and coupled to the conduit to remove the fluid as the pump is driven;

a first electrical motor positioned in the well, and coupled to the pump for driving the pump when the motor is energized;

an electrical generator having an input shaft, positioned at the surface location and coupled to the first motor over an electrical cable to energize the motor, such that the generator output voltage supplied to the motor has a substantially constant amplitude/frequency ratio over the generator operating range;

a variable drive unit, coupled to the generator input shaft for displacing the shaft at a constant torque; and means for supplying energy to the variable drive unit.

6. A system as claimed in claim 5, in which the variable drive unit includes means for adjusting the level of the torque transferred to the generator input shaft.

7. A system as claimed in claim 5, in which a second motor is connected to supply energy to the variable drive means, and electrical energy is supplied to the second motor to drive the input shaft of the variable drive means.

* * * * *